United States Patent
Stroh (10) Patent No.: US 11,046,343 B2
(45) Date of Patent: Jun. 29, 2021

(54) DEVICE FOR TRANSPORTING ITEMS (71) Applicant: Trasgate Limited, Gateshead (GB)

(72) Inventor: Isaac Stroh, Gateshead (GB)

(73) Assignee: TRASGATE LIMITED, Gateshead (GB)

(*) Notice: Subject to any disclaimer, the term of this patent is extended or adjusted under 35 U.S.C. 154(b) by 2 days.

(21) Appl. No.: 16/749,603

(22) Filed: Jan. 22, 2020

(65) Prior Publication Data

US 2020/0247446 A1   Aug. 6, 2020

(30) Foreign Application Priority Data

Jan. 31, 2019   (GB) ...................................... 1901377

(51) Int. Cl.
*B62B 3/02*   (2006.01)
*B62B 3/00*   (2006.01)
*B62B 5/00*   (2006.01)
*B62B 5/06*   (2006.01)

(52) U.S. Cl.
CPC .............. *B62B 3/027* (2013.01); *B62B 3/005* (2013.01); *B62B 5/0003* (2013.01); *B62B 5/0013* (2013.01); *B62B 5/067* (2013.01)

(58) Field of Classification Search
CPC ....... B62B 5/0013; B62B 3/005; B62B 3/027; B62B 5/067
See application file for complete search history.

(56) References Cited

U.S. PATENT DOCUMENTS

| | | |
|---|---|---|
| 3,082,016 A | 3/1963 | Pratt |
| 3,493,262 A | 2/1970 | Ferneau |
| 3,669,031 A * | 6/1972 | Cole ......................... A47B 3/00 108/102 |
| 4,398,736 A | 8/1983 | Wijn |
| 4,725,183 A | 2/1988 | Smillie, III |
| 4,953,878 A | 9/1990 | Sbragia |

(Continued)

FOREIGN PATENT DOCUMENTS

| | | |
|---|---|---|
| CN | 2794959 | 7/2006 |
| CN | 102310877 A | 1/2012 |

(Continued)

OTHER PUBLICATIONS

UK Search Report dated Jul. 16, 2019 from related UK Application No. GB1901377.0.

*Primary Examiner* — James A Shriver, II
*Assistant Examiner* — James J Triggs
(74) *Attorney, Agent, or Firm* — Innovation Capital Law Group, LLP; Vic Lin (57) ABSTRACT

A device has a cuboidal basket portion defining a cavity. A front pair of legs is attached to the basket portion such that the front legs are pivotable about a first axis, and each front leg has a wheel. A rear pair of legs is attached to the basket portion such that the rear legs are pivotable about a second axis, and each rear leg has a wheel. A handle is attached to the basket portion and is pivotable around a third axis. The device has a basket configuration in which the handle is located across and above the basket portion and the legs are collapsed with the wheels located adjacent to a base of the basket portion. The device has a trolley configuration in which the handle is located rearward of the basket portion and the legs are extended for supporting the basket portion.

20 Claims, 4 Drawing Sheets

(56) References Cited

U.S. PATENT DOCUMENTS

| | | | |
|---|---|---|---|
| 5,123,665 | A | 6/1992 | Levy |
| 5,649,718 | A | 7/1997 | Groglio |
| 6,045,150 | A | 4/2000 | Al-Toukhi |
| 6,070,899 | A | 6/2000 | Gines |
| 6,328,329 | B1 | 12/2001 | Smith |
| 7,658,388 | B1 | 2/2010 | Rodriguez et al. |
| 8,162,349 | B1 | 4/2012 | Roselle |
| 8,408,581 | B1 * | 4/2013 | Hunter .................. B62B 3/027 280/651 |
| 8,540,273 | B2 * | 9/2013 | Dobrachinski ....... B62B 5/0003 280/651 |
| 8,979,115 | B1 | 3/2015 | Baron |
| 9,126,610 | B1 | 9/2015 | Abiri |
| 9,399,476 | B1 * | 7/2016 | Stankevitz ............ B62B 5/0003 |
| 9,573,610 | B1 | 2/2017 | Chaturvedi et al. |
| 10,232,867 | B1 * | 3/2019 | Jones .................... B62B 3/1404 |
| 2002/0149176 | A1 | 10/2002 | Miller |
| 2005/0140119 | A1 * | 6/2005 | Wong .................... B62B 3/027 280/651 |
| 2005/0173878 | A1 | 8/2005 | Espejo |
| 2006/0049614 | A1 | 3/2006 | Shamah |
| 2008/0093827 | A1 | 4/2008 | Silberberg |
| 2008/0303248 | A1 | 12/2008 | Chaparro |
| 2009/0295108 | A1 | 12/2009 | Oku |
| 2010/0140887 | A1 | 6/2010 | Yehiav et al. |
| 2010/0230934 | A1 | 9/2010 | Fine |
| 2011/0156375 | A1 | 6/2011 | Gal |
| 2011/0169235 | A1 | 7/2011 | Moster |
| 2011/0208613 | A1 | 8/2011 | Parham |
| 2013/0049311 | A1 | 2/2013 | Metters et al. |
| 2014/0001735 | A1 | 1/2014 | Yang et al. |
| 2014/0140797 | A1 | 5/2014 | Howe |
| 2014/0346757 | A1 | 11/2014 | Fine |
| 2016/0200340 | A1 | 7/2016 | Stankevitz |
| 2016/0347341 | A1 | 12/2016 | Tauber |
| 2020/0223465 | A1 * | 7/2020 | Geffen .................. B62B 3/027 |

FOREIGN PATENT DOCUMENTS

| | | |
|---|---|---|
| CN | 205615550 U | 10/2016 |
| DE | 19611542 A1 | 9/1997 |
| DE | 19812119 A1 | 9/1999 |
| DE | 20200679 U1 | 3/2002 |
| DE | 20120091 U1 | 4/2002 |
| DE | 102008061318 A1 | 6/2009 |
| DE | 102008031541 A1 | 1/2010 |
| DE | 102009025665 A1 | 12/2010 |
| DE | 202010014136 U1 | 3/2011 |
| DE | 202010008627 U1 | 2/2012 |
| EP | 0043873 A1 | 1/1982 |
| EP | 1700765 A1 | 9/2006 |
| EP | 1733947 A2 | 12/2006 |
| ES | 1066771 U | 3/2008 |
| ES | 1097030 U | 12/2013 |
| FR | 2700150 A1 | 7/1994 |
| FR | 2756242 A1 | 5/1998 |
| FR | 2768684 A1 | 3/1999 |
| FR | 2775645 A1 | 9/1999 |
| FR | 2885581 A1 | 11/2006 |
| GB | 2488324 A | 8/2012 |
| KR | 20030084458 A | 11/2003 |
| WO | 2001096166 A1 | 12/2001 |
| WO | 2007104071 A1 | 9/2007 |
| WO | 2009109025 A1 | 9/2009 |
| WO | 2010001398 A1 | 1/2010 |
| WO | 2010125509 A1 | 11/2010 |
| WO | 2011065808 A1 | 6/2011 |
| WO | 2011114326 A1 | 9/2011 |
| WO | 2012175904 A1 | 12/2012 |
| WO | 2013191700 A1 | 12/2013 |
| WO | 2015188321 A1 | 12/2015 |
| WO | 2017037702 A1 | 3/2017 |

* cited by examiner

DEVICE FOR TRANSPORTING ITEMS

The present disclosure relates to devices for transporting items, and particularly to devices for transporting shopping, groceries and the like. In particular, the disclosure describes devices having a trolley configuration and a basket configuration.

BACKGROUND TO THE INVENTION

Commonly, shoppers navigate supermarkets and shops to retrieve items such as groceries, hardware, etc. from shelves to take those items to a cashier. In order to transport these to the cashier, shoppers often find it convenient to use a basket or trolley (a "shopping cart" in American English). Often these are provided by the shop, but a shopper must decide at the entrance to the shop whether to take a basket or a trolley around the shop with them. A basket may be preferred when relatively few items are desired, as the basket may be less cumbersome to manoeuvre around the shop than a trolley is. However, a shopper often finds themselves taking more items than they had anticipated which can overload the basket and make it difficult for the shopper to carry. In other examples, a trolley may be the preferred option, but for occasional parts of the shopping process a basket may be significantly less cumbersome for a user, for example, while navigating stairs. There is therefore a need for a device for transporting items which can take a basket configuration and a trolley configuration, according to a user's preference.

While attempts have been made to create such devices, these are typically primarily either a basket with only token functionality as a trolley or vice-versa. The present invention describes a device truly capable of functioning as a basket and as a trolley, according to user preference. It will be appreciated that while the device is presented in the context of shopping, such devices may also be used in other contexts, such as moving items around warehouses or homes.

SUMMARY OF THE INVENTION

Disclosed herein is a device for transporting items, comprising:

a generally cuboidal basket portion defining a cavity for receiving items, the basket portion having a base, an open top, two side walls spaced apart by a width of the basket portion and a front wall and a rear wall spaced apart from each other by a length of the basket portion;

a front pair of legs pivotally attached to the basket portion at a first end of each front leg such that the front pair of legs is pivotable about a first axis, and wherein each of the front legs has a front leg length and wheel at a second end of each front leg, spaced from the first end by the front leg length;

a rear pair of legs pivotally attached to the basket portion at a first end of each rear leg such that the rear pair of legs is pivotable about a second axis, and wherein each of the rear legs has a rear leg length and wheel at a second end of each rear leg, spaced from the first end by the rear leg length; and a handle pivotally attached to the basket portion such that the handle is pivotable around a third axis; wherein the device is configurable in a basket configuration and a trolley configuration; wherein in the basket configuration:

the handle has a horizontal portion located across the width of the basket portion and above a central portion of the open top, the handle being configured for carrying the device; and the front and rear pairs of legs are collapsed so that the wheels of the front and rear pairs of legs are located adjacent to the base of the cuboidal portion; and wherein in the trolley configuration:

the handle has a horizontal portion located rearward of the midpoint of the length of the basket portion, spanning the width of the basket portion, the handle being configured for pushing the device; and the front and rear pairs of legs are extended for supporting the basket portion and the wheels of the front and rear pairs of legs spaced away from the base of the cuboidal portion by the front and rear leg lengths respectively such that each of the four wheels lies in a single plane.

This arrangement allows a user to use the device as a basket in the basket configuration and as a trolley in the trolley configuration. In the basket configuration, the handle is positioned above a central portion of the open top of the basket, meaning that when held off the ground by the handle, the centre of gravity aligns itself beneath the horizontal part of the handle. Thus, placing the handle over a central portion of the basket portion allows a user to conveniently pick up and carry the device, because it can help to keep the basket portion flat while it is being lifted, so a user does not need to strain to keep items inside the basket, or indeed to retain the ordering inside the cavity against a tilting as the basket is lifted (as would be the case, for example when the centre of gravity is not broadly below the handle). In this context, a central portion is located between the front and the rear of the basket portion. The positioning may be chosen to ensure that, when lifted by the handle (such that the centre of mass hangs below the horizontal part of the handle), the rim at the edge of the open top of the basket portion makes an angle of no more than about 25° to 30° with the horizontal (in this case, "the horizontal" is defined as being perpendicular to the direction of the local gravitational field). In other cases, the central portion may be defined as being in the middle third of the basket portion as measured from front to back. The horizontal portion of the handle needn't extend perpendicularly across the width of the basket portion, but can extend across the width of the basket portion such that the whole horizontal portion of the handle lies over the middle third of the basket portion. For example, the horizontal portion may extend across the basket in such a way that it runs in a direction which has a component along the length of the basket portion, in addition to extending across the width of the basket portion. Such a device may also provide the benefit that it can be easily loaded into a car as it is folded, as set out in more detail below. Generally cuboidal in this context means having a well-defined, broadly planar opposing sides, a front, a rear opposite the front, and at least a base (optionally a lid too). The sides are approximately orthogonal to the opposing front and rear and also to the base, and the front and rear are approximately orthogonal to the base. Small deviations from the sides, front, rear, and base being exactly planar or meeting one another at slightly rounded corners, or at an angle differing from 90° by a small amount are all examples of shapes encapsulated by the phrase "generally cuboidal".

Also in the basket configuration, the legs are collapsed or folded to lie adjacent to the base. This allows the device to be carried as a basket without the legs getting in the way, and also allows the device to take up less space, for example if it is loaded into a car boot ("trunk" in American English). As used in this context, "adjacent" means both "in contact with" and more generally covers "lying close to", for example, the legs may be pivoted such that they lie along (i.e. generally parallel to) the base, albeit separated by a small gap, e.g. a gap less than the diameter of the wheels thereby bringing the wheels close to the base.

When in the trolley configuration, the handle has a horizontal portion extending across the width of the cavity, rearward of the rear of the midpoint of the length of the basket portion. This may mean that the handle lies over a rear portion (in the rearmost half, or over the rearmost third) of the basket portion, or indeed that it lies rearward of the rear wall itself. In some cases as set out in more detail below, the handle itself is adjustable in length (distance between the horizontal portion and the pivoting point for the handle), and/or in the exact angle at which the handle joins to the basket portion, meaning that the handle may be located at different locations relative to the basket portion according to user preference (e.g. for comfort based on the user's height). Where the handle is moveable and/or adjustable, this requirement means that it is positionable across a width of a rearward portion of the basket portion, in some or most of the configurations encountered in use, yet may also be positionable in other locations, for example to allow compact storage. It will be noted that there is an overlap between the range of locations for the handle in the basket and trolley configurations in some cases (e.g. central third of the length for basket configurations and rearward half of the length for trolley configurations). This is consistent with cases where, for reasons of comfort or otherwise, a user prefers to have the handle not move between the two configurations. In some cases, the spacing between the pivotal attachment point of the handle and the horizontal portion of the handle is adjustable when the device is in the basket and/or the trolley configuration. This can also allow a user to adapt the design to provide improved comfort. In some cases the motions made to transition the device between the basket and trolley configurations inherently include a corresponding motion of the handle, for example because the motion of the legs and the handle is coupled in some way.

Similarly, in the trolley configuration, the legs are extended and the wheels are spaced away from the base. Specifically, the wheels are further from the base in the trolley configuration than they are in the basket configuration. This arrangement uses the length of the legs to raise the basket portion away from the floor a suitable height for a user to use the device as a trolley. In some cases, the length of the front legs may be different from the length of the rear legs. Since the front and rear legs pivot about first and second axes (which may be different), the basket portion can be broadly horizontal in the trolley configuration, even when the front and rear pairs of legs have different lengths. Alternatively, the different leg lengths in the front and rear pairs can help to allow the basket portion to be tilted relative to the plane in which the wheels lie in the trolley configuration, so allowing a user to view into the basket while pushing it, for example, and helping to allow items to be added to the cavity in an ordered, stacked fashion. In particular the base of the basket portion may be planar and wherein the plane of the internal surface of the base slopes relative to the plane in which the wheels lie when the device is in the trolley configuration. This assists in ordered stacking since the lowest point of the basket portion is a corner of the basket portion between the base and a front or rear wall, i.e. it is smaller than the full area (width by length) of the basket portion. This provides a definite location for the lowest point, and is a preferred place for heavier or tougher items to be placed so that they do not rest on and damage lighter or more fragile items.

The basket may slope in either direction relative to the plane of the wheels, which is to say that a distance between the front wheels and the internal planar base surface is different from a distance between the rear wheels and the sloping base when the device is in the trolley configuration. For example, where a user desires to see into the cavity of the basket portion, the base of the basket portion may slope such that the rear end of the base (nearest to the handle, and thus also to the user) is lower than the front end of the base when the device is in the trolley configuration, in other words the rear wheels are closer to the base than the front wheels are. In other cases, the basket portion may slope in the other direction, such that the front wheels are closer to the base than the rear wheels are, which is equivalent to saying that the front end of the base (furthest from the handle, and thus from the intended position of the user) is lower than the rear end of the base when the device is in the trolley configuration. The slope of the basket portion (for example the angle between a planar base of the basket portion and the plane in which the wheels lie) may be in the range 10° to 45°, more preferably in the range 17° to 40°, even more preferably between 25° and 30°.

Additionally one or more of the legs may be adjustable based on user preferences and physiology. This may include adjusting the length of the legs and/or the angle at which any or all of the legs lock in the trolley configuration. This can help both to adjust the height and the angle relative to the ground of the basket portion when the device is in the trolley configuration, as well as to help even out the legs, for example to ensure that the wheels all lie in a single plane. Indeed, the adjustable legs may be used to change the basket portion from tilting one direction to the other (e.g. from forward, away from a user to backward, toward a user). It may also be possible to arrange the basket portion so that it does not slope relative to the plane of the wheels (i.e. the base of the basket portion is broadly parallel to the plane of the wheels) by adjusting the leg lengths appropriately.

Optionally, the device also has an external planar surface on an outer surface of the base of the basket portion, for example, for resting the device on the ground when the device is in the basket configuration. This may be parallel to the plane in which the wheels lie in the trolley configuration. This allows the device to retain the angle the basket base makes with the ground irrespective of whether the device is in the trolley configuration, resting on its wheels or in the basket configuration, resting on the external planar surface. This in turn can help any careful stacking of items by a user to retain their arrangement during and after a transition between the two configurations.

Note that in some examples above, e.g. where the internal surface slopes relative to the plane of the wheels in the trolley configuration and the external surface is parallel to the plane of the wheels, there is implicitly a wedge- or trapezium-shaped element beneath the basket portion. This element can provide a space for storing the wheels when the wheels are folded into their location in the basket configuration. That is to say there may be at least one recess for receiving the front and/or rear wheels when the device is in the basket configuration, wherein the recess is located on an external surface of the base. The recess may include a slot or simply an alcove into which the wheels can fold during the pivoting motion. Providing a recess for the wheels can help to reduce the likelihood that the wheels (which roll over the ground when the device is in use in the trolley configuration) will transfer dirt to a user, or to the inside of a car, for example. Providing this recess in a separate wedge or trapezium shaped element allows the wheels to be retained in the recess while allowing for a reasonably large volume of the basket portion. That is, the volume of the basket portion is not reduced to make room for the wheels (which are in any case not stored in the basket portion when the device is in the trolley configuration).

The pivotal motion of the wheels and the handle allows convenient transitions between the basket and trolley configurations. The motion of the front legs, the rear legs, and/or the handle can be coupled to one another to allow a single motion to transition the device between the basket and trolley configurations. In other examples, the motions may be entirely separate. For example the front and rear pairs of legs may be pivotable independently of one another. This can help a user to load the device into a car boot (or onto any other raised surface, for example a counter at the till of a shop) by wheeling the device towards the car boot and pushing the front edge of the basket portion over the edge of the car boot, retracting the front wheels, and continuing to push while raising the rear wheels (the net result being the device in the basket configuration, inside the car boot). In order to assist in this, the transition from the trolley configuration to the basket configuration may include the front and/or rear wheels swinging rearward and towards the base. This allows the pushing action of a user from the rear (using the handle, in the trolley configuration) to assist in forcing the legs to transition from their trolley configuration to their basket configuration. In cases where the basket portion slopes downward away from the user (e.g. so that the front of the basket portion is lower than the rear of the basket portion), the user may benefit from being able to rest the lower part of the basket on the lip of a car boot, such that the car boot in turn takes much of the weight of the device, because the lowest part of the basket may be where most of the weight of the device is located when loaded with items. Of course a user can alternatively fold the device into the basket configuration on the ground near to a car, and lift the basket into the car, if they prefer.

In other examples, the device may be configured so that it can be rotated so that the rear of the device faces towards the car boot. In these examples pushing the device from the front can assist user in loading the device into a car boot. Rotating the device in this way may be assisted by swinging the handle towards the front of the device so that the user is provided with convenient means for pushing the device towards the boot. The direction of swing of the legs may be towards the front, to allow them to swing away from the rear, where the boot is. In other words, one or both sets of legs can swing in such a way as to avoid the car when the device is pushed up against a boot, by swinging away from the location of the boot. The device can be arranged in such examples wherein the trolley configuration has a portion which slopes upwardly at a rear end of the device to assist in engaging with a car boot. In addition, other features such as softened or gripping portions may be provided at the rear. Similarly at the front end, it may be convenient to locate actuators for activating or releasing locking means for the legs and/or handle so that the user can trigger a transition between the trolley configuration and the basket configuration while pushing the device from the front as described above. The ability to rotate the device to allow the rear to be loaded first as described above can allow the slope of the basket portion in the trolley configuration in normal use (e.g. pushing the device around a shop) to slope relative to the plane of the wheels in a first direction which is preferred by a user. Since the device can be rotated prior to loading, the slope of the basket portion in normal use in the trolley configuration is independent of the slope which may be beneficial for helping to load the device into a car boot.

In order to assist in the loading process described above, an external region of the front edge of the base of the basket portion of the device may be adapted to engage with the lip of a car boot. For example, the external region may have a portion which slopes upward towards the front of the device, relative to the plane in which the wheels lie when the device is in the trolley configuration. This sloping portion can help the device to engage with car boots of different heights when the device is in the trolley position, because the sloping portion slopes upwards towards the front of the device so the sloping portion engages with a lip of any height, at some way along the sloping portion. The sloping portion may be conveniently arranged to slope such that the height of the sloping portion above the ground varies within a range of commonly found boot heights. For example, the sloping portion may have a height above the ground (that is a spacing from the plane of the wheels) ranging between 500 mm (about 19.5 inches) at the rearmost part of the slope and 1000 mm (around 39.5 inches) at the front of the sloping portion. Other heights may be selected according to expected boot heights. Indeed, as mentioned elsewhere, the length of some or all of the legs may be adjustable, so allowing a user to adjust the height range of the sloping portion and indeed the range of heights encompassed by the sloping portion and in particular to optimise the height for their own car boot. In some cases, the cuboidal basket portion may slope such that the front of the basket is lower than the rear of the basket. This leads the front wall of the cuboidal basket portion to slope upwards at its front. In other words, in some cases the front wall can be thought of as providing a sloping surface for engaging with a car boot. In other cases the sloping surface can be provided as part of e.g. a wedge- or trapezium-shaped portion between the internal (for supporting groceries, etc.) and external (for resting the basket configuration on the ground) bases of the basket portion.

The external region may include a padded portion for inhibiting damage to the car boot. In other examples the external region includes a textured portion for gripping the car boot. For example a protective rubber overmould may be provided which can help to soften the exterior of the device and reduce damage to the car boot. In addition a rubber overmould can help to grip the car boot, particularly where the overmould includes a textured portion. This prevents the basket portion from slipping away from the boot when the basket portion is rested on the boot by a user. Where a rubber overmould is thick enough, for example more than 5 mm (about 0.2 inches) or even 10 mm (about 0.4 inches) or thicker, the dual functions of gripping and inhibiting damage may be provided by a single feature. In this context, rubber includes natural rubbers, synthetic rubbers and silicone rubbers as well as other suitable elastic or elastomeric materials. Other suitable materials may include polymers.

Additionally or alternatively to the basket portion having an external portion for engaging the boot, a portion of the front pair of legs may be adapted to engage with the lip of a car boot. As set out above, this may include padded portions to reduce damage to the boot, for example. The purpose of such portions may be to help a user load the device when in the trolley configuration into a car boot using a simple single motion. In some examples the transition from the trolley configuration to the basket configuration includes the front and/or rear wheels swinging rearward and towards the base. By pushing the device in the trolley configuration towards a car boot, the basket portion can engage with the car boot. Subsequently, the front wheels contact the car boot (via their portions adapted for this) and the pushing motion can help the front wheels to retract towards their basket configuration by swinging rearwards and towards the base.

The pivotal motion of both legs in each pair may be coupled, so that, e.g. extending a left leg of the front pair necessarily moves the right leg of the front pair. In other cases each leg is independently pivotable within a pair, for example each one of the pair of front legs may be pivotable independently of the other leg in the front pair of legs. The front pair of legs may be so named because its wheels are located more towards the front of the device than the wheels of the rear legs, at least when the device is in the trolley configuration. The four wheels (one per each leg: two legs in the front pair, two legs in the rear pair) may be arranged so that they are located at the corners of a rectangle, trapezium, or other quadrilateral.

Where the wheels are said to lie in a single plane, this should be interpreted as meaning that the portion of each wheel which is intended to contact the ground lies in a single plane, so that the device can rest stably on flat ground without rocking. Obviously as the device is moved over the ground, the exact point at which the wheel contacts the ground changes as the wheel rotates.

In some examples, the first axis is different from and parallel to the second axis. This can help to align the wheels in a single plane. Typically, the legs in each pair are approximately the same length, so pivoting the legs about axes which are not the same, but are parallel, helps ensure that the wheels remain in a single plane, for stability.

Terms such as: up, upper, top, above, base, bottom, lower, below, front, frontwards, rear, rearward, back, backwards, horizontal, vertical and so forth should be interpreted self-consistently, except where the context makes clear that these refer to absolute directions (e.g. relative to the direction of the local gravitational field). That is to say, where the basket portion is described as having a front, for example, the front pair of legs is closer to the front than the rear pair of legs is. Similarly, the open top of the basket portion is located above the base of the basket portion. Things described as "above the open top" are therefore further from the base than the open top is from the base, and things described as "below the base" are further from the open top than the base is from the open top. These descriptions are self-consistent in that they are irrespective of the actual orientation of the device, but remain true relative to the other parts of the device. For convenience of understanding, the terms are used in the normal orientation of the device in use. For example in the trolley configuration, the wheels are intended to rest on the ground, supporting the basket portion above them. However, where the ground slopes, the basket will not be directly above the wheels in an absolute sense, for example. A user holds the handle at the rear, and pushes the device forwards (in a frontward direction in the trolley frame of reference), while facing forwards themselves, with the device in front of the user. In this arrangement, the terms, up, down, forward, backwards, etc. have an intuitive meaning, but e.g. when the device is being transported, displayed for sale, rested on sloping or uneven ground, etc. the device may be tilted or resting on its side, in which case the part labelled as the open top may not actually be at the true top (in this case "true top" refers to the highest point in the local gravitational field) of the device.

The basket portion may be formed from a suitably rigid and durable material, for example, one which is water resistant, so that the device may be used outdoors. As an example, injection moulded acrylonitrile butadiene styrene (ABS) provides a durable material in an easily shapeable format. The legs and handle, and sections of a frame (e.g. for holding the basket portion, or even as part of the basket portion) may be formed from stainless steel or aluminium, for example. The wheels may be formed from injection moulded plastics (e.g. ABS) with rubber coatings acting as a tyre, for example. As an example, they may be approximately 80 mm (about 3 to 3.5 inches) in diameter.

In some examples the third axis is the same as one of the first or second axes. That is to say that the handle pivots about the same axis as one or both of the axes around which the legs rotate. Forming all three axes in the same location can simplify manufacture, whereas separating one or more of the axes from the other can help provide different movement types to each pivoting part (front leg pair, rear leg pair, handle).

In some examples the handle is attached adjacent to the base of the basket portion. This provides support to the base of the basket portion and helps to ensure that heavy loads are adequately supported.

The front and/or rear pair of legs may be permanently fixed to the basket portion. This ensures that the user cannot accidentally detach the basket portion from the legs, thereby losing the use of the leg parts until they can be reattached. This may be a difficult manoeuvre in some cases, for example if the user has picked up the basket portion when it contains many heavy items. In other cases, the basket portion may be detachable from the legs, so that e.g. a user can detach the entire basket portion from the device and place it on a conveyor belt or other counter for payment of the goods in the basket. The shopkeeper can then scan the items in the basket portion, one by one, and hand the packed basket back to the shopper. Of course, the entire device can be placed on a counter by collapsing it into a basket configuration, as an alternative to detaching the basket portion. In some cases this may be achieved in an analogous manner to the loading into a car boot described above. For example this may include pushing the device in the trolley configuration into the counter while retracting the legs.

In some variants, the cavity is subdivided into compartments. This can help to keep fragile or delicate items separately from heavier ones, to prevent damage to the fragile/delicate items. The compartments may have specific compartments for e.g. bottles, flowers, small items such as nuts and bolts, or other specific types of item. In some examples one or more cavities may be provided with a lid and being lined with a thermally insulating material. This allows a user to shop for frozen, chilled or heated items, and to keep them frozen, chilled or heated, respectively until they have paid for the items, and even to bring them home in that state. Providing two such compartments can allow a user to pick up both ice cream and a hot roast chicken in a single trip, for example without the chicken melting the ice cream and the ice cream cooling the chicken.

As a further development of this, the compartments may be individually removeable and/or replaceable from the device. This can help a user to remove only some of the contents of the basket portion at a time. Since the trolley configuration may be preferred over the basket configuration to avoid the difficulty of carrying heavy weight around, the ability to lift the contents conveniently onto a counter may be preferred over having to lift the whole basket portion as a single unit, and also over lifting each item in the basket portion separately. In some cases, the removeable/replaceable compartments may be supplied as a kit of parts, for interchanging depending on the use to which a user intends to put the device. For example, there may be kits for shopping for groceries (having compartments for bottles, thermally insulating compartments, smaller subdivisions for soft fruits, etc.), kits for shopping for hardware (including smaller pouches and closed-base compartments for screws, nuts, bolts etc.; sturdy compartments for tools or heavy materials, clips and straps for holding elongate materials such as pipes and wooden beams firmly to the device), kits for shopping for electronic goods (including e.g. electrostatic resistant linings) and so forth. Depending on the situation, these kits can be mixed together for a trip to multiple shops. In other cases multiple kits may be left in a user's car, and a bespoke interior arrangement of the basket portion can be prepared when the device is unloaded from the car, with the specific selection of inserts being chosen by the user at that time for the specific shop they are visiting. They may then switch the (full) inserts from the first shop for (empty) inserts prior to setting off to a second shop to purchase more items, and so forth. In some cases, the compartments themselves may remind a user that particular items were desired, so reducing the need for a shopping list. For example where a user has selected a compartment for holding bottles, they may be reminded that they intend to purchase milk during a shopping trip.

The device may further comprise selective leg locking means for selectively locking the front and/or rear legs in their position for the basket configuration and/or the trolley configuration. Similarly, the device may further comprise selective handle locking means for selectively locking the handle in its position for the basket configuration and/or the trolley configuration. This can help provide a sturdy device. The handle and/or the legs may each have many different stable/locked positions for adjusting to user comfort. These locking means can also provide the user with a device that firmly retains each configuration, and does not transition between basket and trolley configurations unless the user wants it to. The device may further comprise an actuator for activating selective locking means of the leg(s) and/or the handle. The activator may be located on the handle, on the base of the basket portion, the rear of the basket portion, on the rear legs, etc., depending on convenience. In some cases, the actuators for controlling the locking of the front legs, the rear legs and/or the handle may be located in different places, and/or may be separately controllable, to allow a user to control which parts of the device are unlocked, and thus carefully control the transitioning process between basket and trolley configurations. The actuator(s) for one or both pairs of legs may be located on the rear of the basket portion, for example, so the user can actuate the unlocking/phase while pushing the device towards a car boot. Where an actuator is located away from the mechanism which it actuates, for example for convenience or comfort reasons, any suitable means for transferring the actuation to the locking mechanism, e.g. a Bowden cable, can be used.

In some examples, at least one of: the front pair of legs; the rear pair of legs; and the handle is biased towards its location in the trolley configuration. This allows any locking mechanism to be triggered to unlock by a user which can cause the device to transition from the basket configuration to the trolley configuration. For example if this is triggered as a user lifts the device in the basket configuration, the legs may be forced downwards, into the ground, thereby supporting the basket portion as the user lifts until the legs are fully extended. In some cases, the biasing may be sufficiently strong that when the locking mechanism is released, the basket portion is pushed upwards away from the ground, without a user needing to lift at all.

In order to help fold the device from the trolley configuration to the basket configuration, at least one of the rear legs may have a handle for pulling the leg towards its location in the basket configuration. In cases where the motion of the rear legs is coupled, only one leg need be pulled upwards to fold the rear pair of legs. However, even in this case, it may be beneficial to provide a handle on each rear leg for the convenience of both right- and left-handed users. Where the legs are independently moveable, it may be preferable to provide a handle on each of the rear legs.

At least one of the wheels is provided with a brake in some examples. This can help a user navigate the device on sloping ground, for example, or to keep the device in place while they open the car boot. The brake may be actuated by controls on the handle or the basket portion, or it may be configured for operation by a user's foot.

In some examples at least one of the wheels is a swivel castor wheel. In other words, in addition to being able to rotate to roll the device, the wheels may have an additional rotational axis to allow them to rotate about an axis generally aligned with the direction in which the leg to which they are attached is elongate. This can help to provide better handling to the device in the trolley configuration, and allow more controlled and easy steering. In some examples with swivel castor wheels, where the swivel castor wheels are arranged to be housed in a recess when in the basket configuration, the recess and the wheels may be arranged to interact as the legs are folded towards the basket configuration to ensure that the castors rotate to align the wheels with the recess. In other cases, the castors may naturally rotate to an orientation for housing in the recess, for example due to the centre of gravity of the wheel lying off the castor rotational axis.

The device may further comprise one or more hooks on the exterior of the basket portion, for example to allow additional bags, a user's coat, etc. to hang from during use. Additionally or alternatively, the device may be provided with a pocket or pouch on the exterior of the basket, for example for storing keys, coins, etc. while shopping. In some cases, a roll up plastic hood may be provided in a storage pouch or other suitable storage means, the plastic hood being sized for covering the open top, e.g. to protect the cavity from getting wet when it is raining.

BRIEF DESCRIPTION OF THE DRAWINGS

The device will now be described in detail with reference to the Figures, in which.

In each of these Figures, the same reference numerals are used to denote the same or similar elements.

DETAILED DESCRIPTION OF THE PREFERRED EMBODIMENTS

Figure 1A:
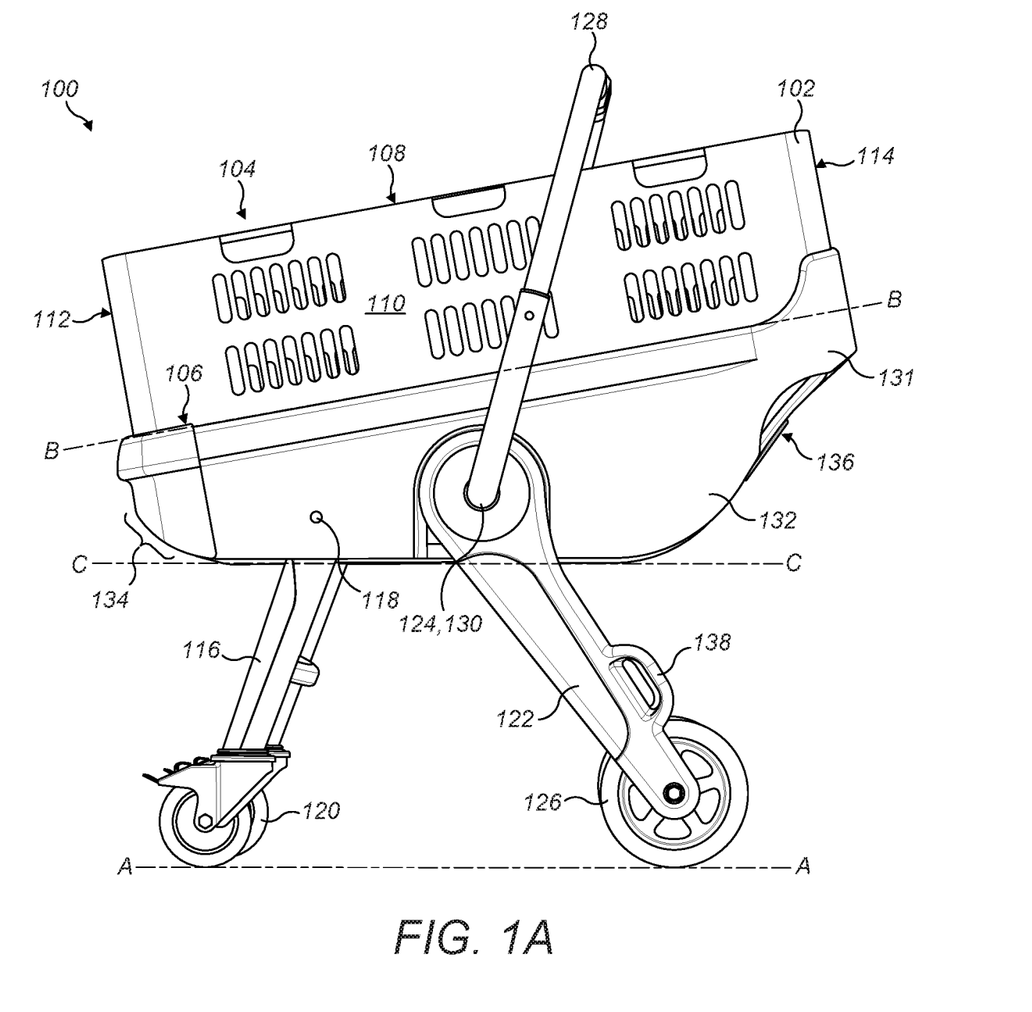
FIG. 1A shows an example of a device in the trolley configuration.
Figure 1B:
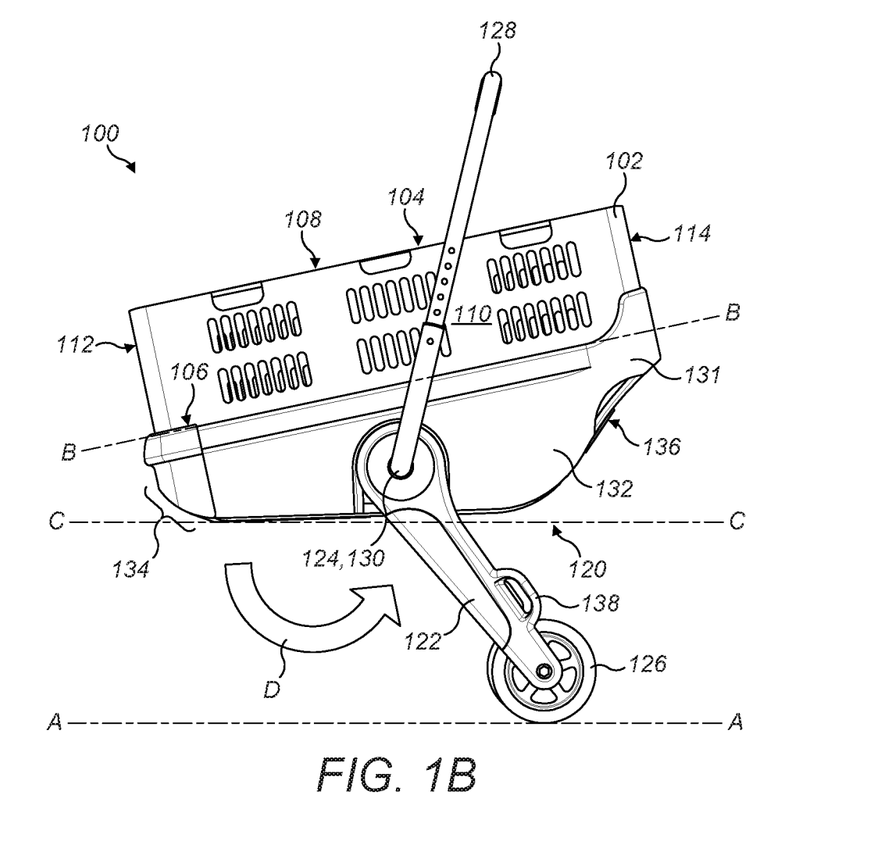
FIG. 1B shows an example of the device of FIG. 1A part way through transitioning from the trolley configuration to the basket configuration.
Figure 1C:
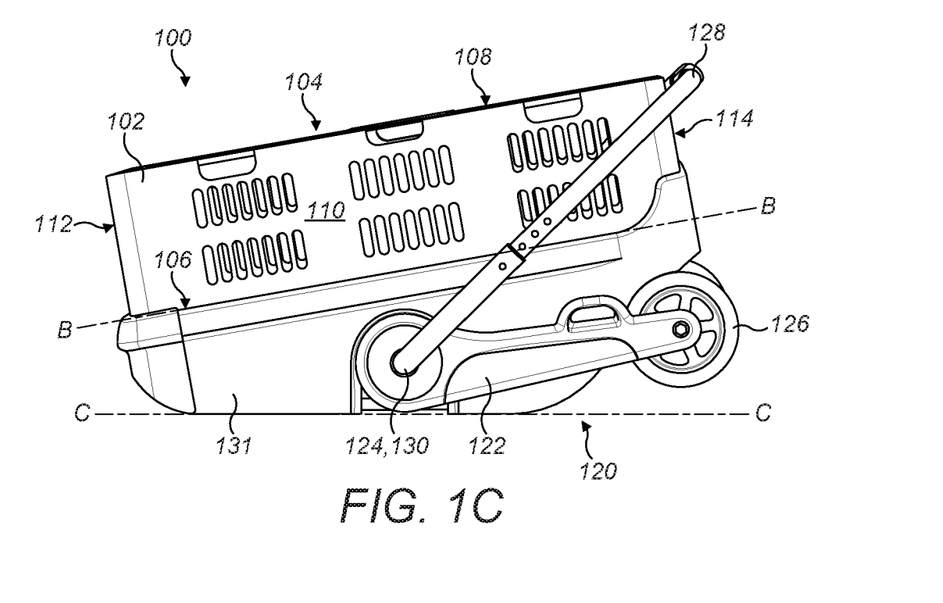
FIG. 1C shows an example of the device of FIGS. 1A and 1B in the basket configuration.

Consider FIGS. 1A to 1C, which shows a device 100 according to the present disclosure as it transitions from the trolley configuration in FIG. 1A to the basket configuration in FIG. 1C. Starting with FIG. 1A, it can be seen that the device 100 has a basket portion 102 at its top, that is to say the basket portion 102 is spaced apart from the ground (which is denoted by dashed line (A), representing, for example, the plane of the ground). The basket portion 102 has a generally cuboidal shape, having a front wall 112, rear wall 114, side walls 110 and an open top 108. A base 106 provides closure to the lowermost part of the basket portion 102. The entire basket portion 102 is tilted with respect to the ground, as is shown by dashed line (B), representing the location of the plane of the base 106 of the basket portion 102, which clearly slopes with respect to the plane of the ground (A). The base 106, side walls 110, front wall 112 and rear wall 114 define a cavity 104 which is arranged for receiving items, for example which a user can take from shelves in a shop and wishes to take to a cashier for payment. The cavity 104 has a length which is the distance between the front wall 112 and the rear wall 114. The cavity 104 also has a width which is the horizontal distance between the pair of side walls 110.

The basket portion 102 is supported above the ground (A) by a front pair of legs 116 and a rear pair of legs 122. At a lower end of each of the legs 116 of the front pair of legs 116, in contact with the ground (A), is a pair of front wheels 120 (one front wheel 120 per front leg 116). Similarly, at a lower end of each of the legs 122 of the rear pair of legs 122, in contact with the ground (A), is a pair of rear wheels 126 (one rear wheel 126 per rear leg 122). The rear legs are provided with a handle 138 to assist in transitioning the device 100 to the basket configuration. Since the base 106 of the basket portion 102 slopes so that the front of the basket portion 102 is lower than the rear of the basket portion 102, and the wheels 120, 126 are on the plane (A) representing the ground, this means that the front wheels 120 in FIG. 1A are closer to the base 106 than the rear wheels 126 are to the base 106. The wheels 120, 126 contact the ground at four points in a plane (A), forming a rectangle or trapezium on that plane (A).

Beneath the basket portion 102 is an irregularly shaped element 131 having as a top surface the plane (B) of the base, and as a lower surface a plane (C) which runs broadly parallel to the plane of the ground (A). This provides a broadly wedge- or trapezium shape to this element 131. This element 131 provides a point at which the front and rear legs 116, 122 attach to the device 100. Specifically, the front legs 116 are pivotally attached to the device 100 at a first axis 118 running horizontally through the element 131, about which the front legs 116 are rotatable in order to transition between basket and trolley configurations. In addition, the rear legs 122 are pivotally attached to the device 100 at a second axis 124 running horizontally (i.e. parallel to the first axis) through the element 131, about which the rear legs 122 are rotatable in order to transition between basket and trolley configurations. This irregularly shaped element 131 is provided with a recess 132 towards the rear of the element 131 (the wider end of the wedge/trapezium) for storing the wheels 120, 126 when the device 100 is in the basket configuration.

It can be seen that the front legs 116 are angled such that the front wheels 120 are located forward of the first axis 118 around which the front legs 116 pivot. This means that in order to rotate the front legs 116 backwards towards the base (for folding the front legs 116 and wheels 120 into the recess 132), the spacing between the first axis 118 and the ground (A) must increase a little, which requires lifting the front end of the basket portion 102 away from the ground (A). In other words, the weight of the basket portion 102 keeps the front legs 116 pushed forwards and thus provides stability to the trolley configuration. The front legs 116 are provided with a stop inside the irregular element 131 to prevent the legs 116 rotating forward indefinitely. This provides a simpler design than requiring a separate lock for the front wheels 116, although in some cases a lock can be provided to provide further stability. The rear legs are provided with a locking mechanism, which ensures that they maintain the position shown for as long as the user wants to retain the device 100 in the trolley configuration. The locking mechanism is actuated using an actuator 136 located on the rear of the device, although this can be located in any convenient location, depending on the exact design.

The front wheels 120 as shown are swivel castor wheels, meaning that the wheels 120 are able to rotate about a vertical axis (as well as rolling about their axles in the usual way for a wheel), for example to help steer. In other words, the wheels 120 can undergo a yawing motion relative to the rest of the device 100, while keeping horizontal the axis of rotation of the wheel 120 about which the wheel is able to roll over the ground (A). Although shown on the front wheels 120, swivel castor wheels could equally be applied to the rear wheels 126 as well or alternatively. While not shown in the Figures, one or more of the wheels 120, 126 can be provided with a brake to prevent the wheels 120, 126 from rotating, for example to rest the device 100 on sloping ground.

It can be seen that the basket portion 102 is tilted with respect to the ground (compare plane (B) with plane (A)). The tilt shown is around 20°, but anywhere between 10° and 45° may be possible depending on the design. The exact shape of element 131 plays a role in the angle the basket portion 102 makes with respect to the ground. Additionally, in some cases, the angle between the basket and the ground can be adjusted by a user by adjusting the length of the front 116 and/or rear 122 legs, and/or the angle at which they lock in place relative to the lower plane (C) of the irregular element 131.

Also provided to the device 100 is a handle 128 extending upwardly past the near side wall 110 from a pivot point at third axis 130 to above the open top 108, rearward of the centre of the length of the cavity 104. This handle 128 is used for pushing the device 100 when in the trolley configuration, for example causing the wheels 120, 126 to roll over the ground. The handle 128 extends horizontally across the whole width of the open top 108, and then down the far side wall 110 to another pivot point on the third axis 130. The handle 128 thus attaches at the base 106 of the basket portion 102, thereby providing support to the basket portion 102 when in the basket configuration as will become clear. In the example shown the third axis 130 is the same as the second axis 124, but in some cases, the rear legs 122 and the handle 128 may pivot around different axes. In some examples all of the first 118, second 124 and third 130 axes are the same. The handle is shown having an adjustable length (i.e. distance between the third axis 130 and the horizontal portion of the handle 128) to adapt the device 100 to different users' body shapes and sizes. In addition, pivoting the handle 128 around the third axis 130 can allow a user to adjust the location of the horizontal part of the handle 128, to make it easier for them to grip the handle 128 when the device 100 is in the trolley configuration. The handle may be lockable at particular preselected lengths and/or angular locations, or freely at any length or angular location in some examples. The handle can be locked into its angular position by virtue of a locking mechanism. In some cases this can be actuated using the same actuator 136 as for locking the rear legs. In other examples, the handle may have its own separate locking actuator.

At the front of the irregular element 131 is a boot engaging portion 134. This is shaped and textured to allow a user to roll the trolley up to a car boot and rest it on the sill of the car boot. For example, the boot engaging portion 134 slopes upwards towards the front, meaning that car boots of different heights can be accommodated under the boot engaging portion 134, as they simply contact the sloping portion 134 at a different horizontal location. The boot engaging portion 134 is also provided with a textured rubber overmould to help grip the car boot and to soften the impact of pushing the device 100 (which is typically made of rigid, durable plastics or metals) into the car boot, thereby reducing the likelihood of damage to the car boot, such as scratching the paintwork, denting the metalwork, breaking light covers, etc.

Consider now FIG. 1B with reference to FIG. 1A, which shows the device 100 of FIG. 1A part way between a trolley and a basket configuration. Here, the front wheels 120 and front legs 116 have been folded backwards and upwards towards the base 106. The front legs 116 and wheels 120 are not visible in FIG. 1B as they have been stored in a recess 132. Comparing briefly FIG. 1A with FIG. 1B, the device 100 is intended to be rested at the front on a car boot lip (car boot not shown in FIG. 1A) while the front legs are extended as in FIG. 1A, for example by pushing the device 100 towards a car boot and continuing to push until the front of the basket portion 102 is resting on the lip of the car boot. Resting the front edge of the device 100 on the car boot in this way can help to support the weight of the device, since the lowest point of the basket portion 102 is resting on the boot.

Further pushing causes the front legs 116 to contact the car boot. At this stage, where one is installed, a user may use the actuator for the front legs 116 to release any locking. Once the legs have been unlocked (or indeed where no locking mechanism for the front legs 116 is present), further pushing causes the front legs to be pushed backwards relative to the device, causing them to swing backwards and towards the base, as indicated by arrow (D) in FIG. 1B. This results in the situation shown in FIG. 1B, where the front of the basket portion 102 is supported by the car boot. To assist in this process, the front legs 116 may have a portion, for example at the upper end of the front legs 116 close to the first axis 118, which is adapted for engaging the car boot. Similarly to the portion 134 at the front of the basket portion 102, this may be padded to prevent damage to the car, for example. The bottom edge (C) of element 131 may be smooth, in order that it can slide easily in order to move further into the boot.

The final part of the transition of the device 100 to the basket configuration is seen in a comparison between FIGS. 1B and 1C. In FIG. 1C, the rear legs 122 have also been folded backwards and towards the base, such that the rear wheels 122 are located above the lower surface (C) of the irregular element 131 and below the rear part of the base 106. As can be seen in FIG. 1C, this leaves the lowest portion of the device 100 as being the lower edge of element 131. As this edge is planar, this provides a surface for resting the device 100 stably on a flat surface, such as the ground (A), a counter for paying a shopkeeper, the interior of a car boot, etc. As part of the transition into the basket configuration, the handle 128 can also be folded. In the example shown, the handle 128 is folded backwards behind the rear wall 114 of the basket portion 102, which can help keep the device 100 compact for transporting in a car boot, for example.

In some examples, either or both pairs of legs 116, 122 and/or the handle 128 may be biased towards their position in the trolley configuration. This may include locking means to retain the legs 116, 122 and/or handle 128 in the basket configuration. Then the basket configuration can easily be obtained by unlocking the legs 116, 122 and/or the handle and allowing the biasing to drive the device 100 towards the trolley configuration.

Figure 2A:
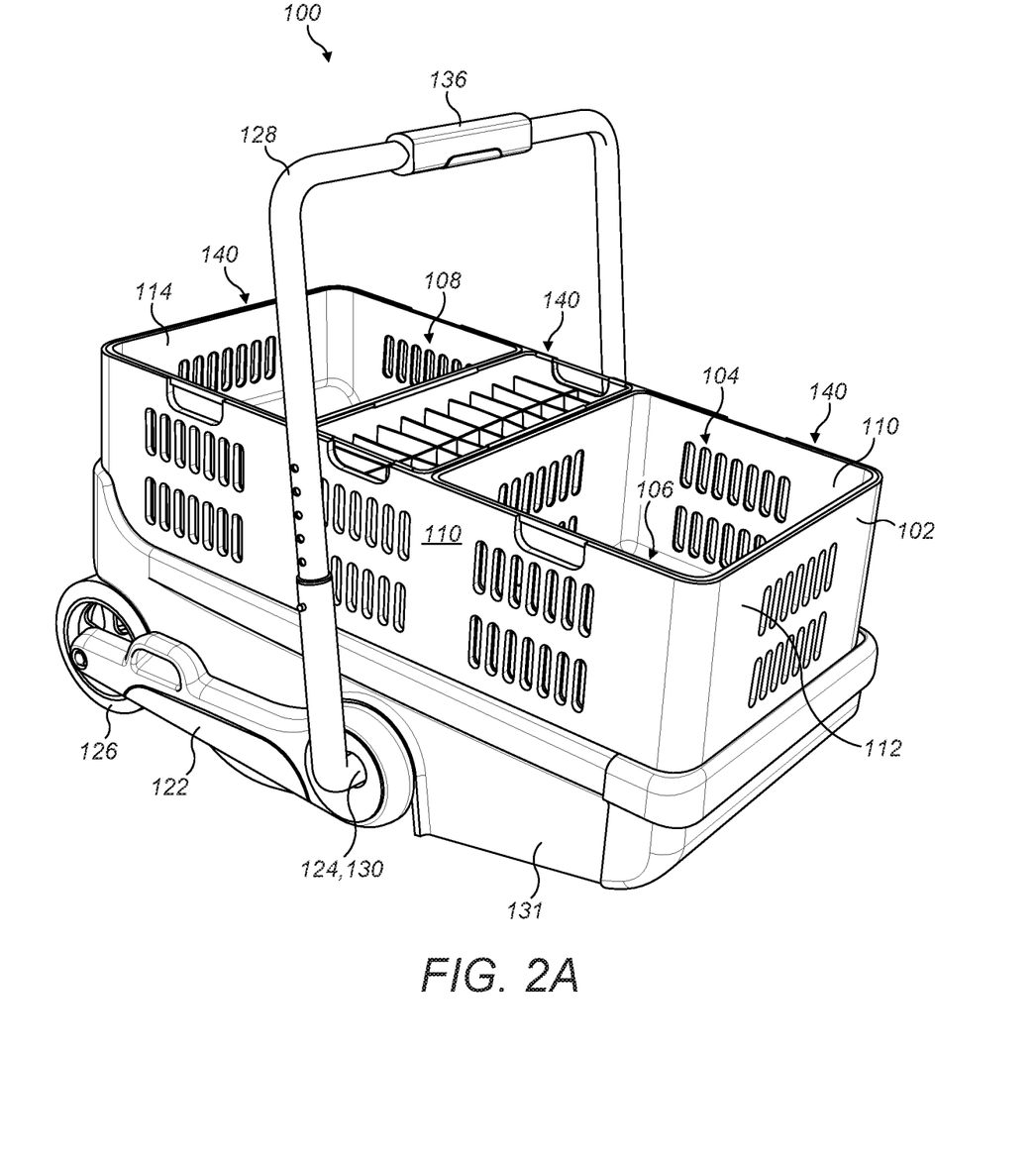
FIG. 2A shows a further example of a device in the basket configuration having removeable compartments.
Figure 2B:
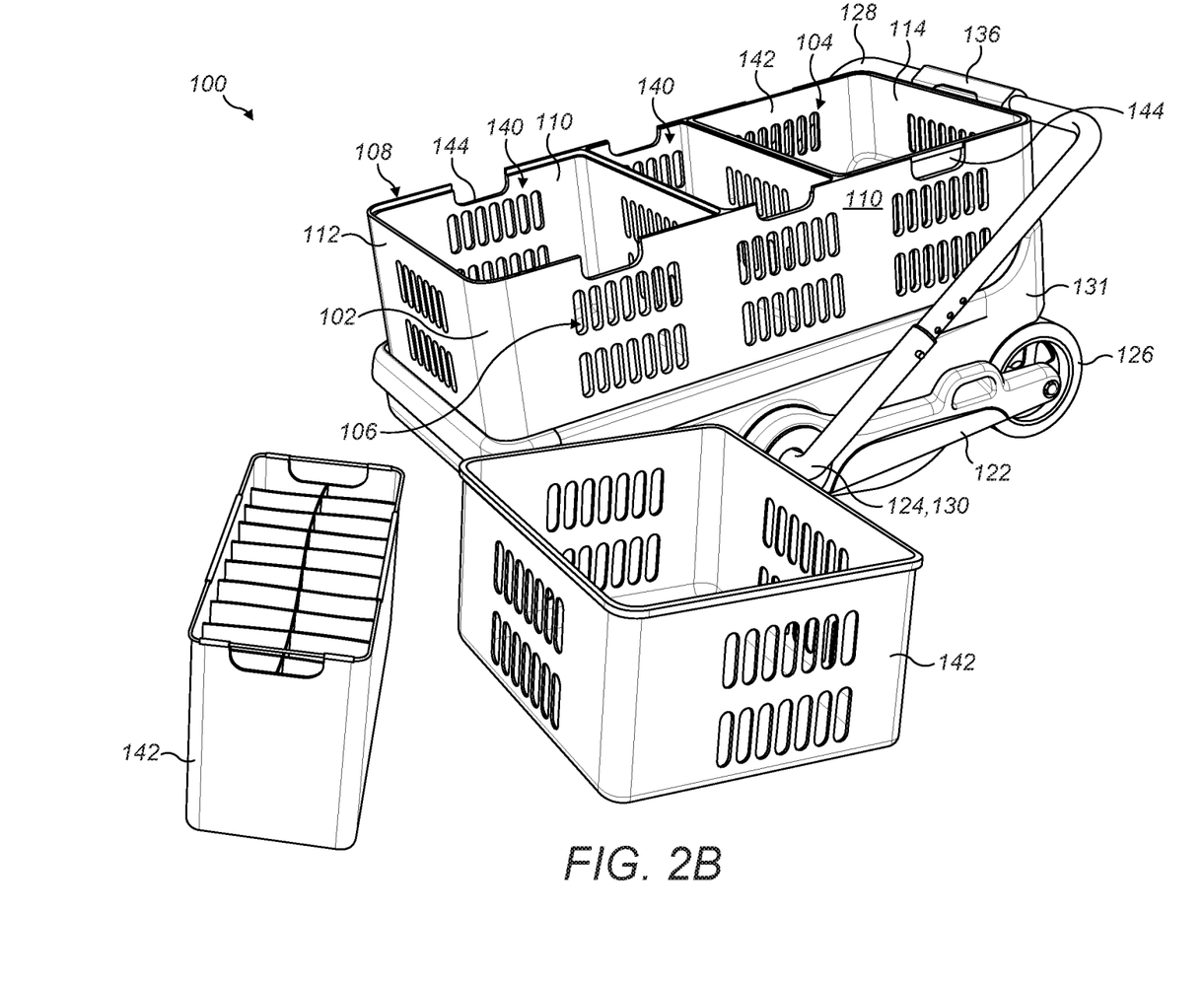
FIG. 2B shows an example of the device of FIG. 2A in which some of the removeable compartments have been removed.

Turning now to FIGS. 2A and 2B, the basket portion is shown in a little more detail. Identical reference numerals refer to similar elements as described in FIGS. 1A to 1C, and will not be described again in detail, for conciseness. As shown, the device 100 is in the basket configuration. In contrast to the basket configuration shown in FIG. 1C, the basket configuration in FIG. 2A has the handle 128 located with its horizontal portion located across the width of the basket portion 102 and above a central portion of the open top 108. This positioning makes it much easier to carry the device 100 as a basket as it helps to ensure that there is minimal torque on the horizontal portion of the handle 128 as the device 100 is lifted.

Also provided on the handle in FIGS. 2A and 2B is an actuator 136. This can be used to trigger the handle 128 to lock in place or to be freely moveable, for example by use of a suitable internal mechanism. In some example the same actuator can be used to control locking of the front 116 or rear 122 legs.

As can be seen in FIG. 2A, the cavity 140 is subdivided into three compartments 140. In the example shown two of the compartments 140 are simply cuboidal spaces separated from the other compartments 140 by internal walls and a third compartment has an internal structure formed from a flexible, durable material such as nylon, shaped so as to hold bottles. While three components 140 are shown, more or fewer is also possible. Similarly, compartments 140 with other internal features can be included, such as a covered, thermally insulating compartment for keeping food hot or cold.

Consider now FIG. 2B, which shows a generally similar arrangement to that shown in FIG. 2A. Here, however, the compartments 140 may be filled with removeable and interchangeable compartments 142. These compartments 142 may be preferred by a user who can buy a modular kit of parts and select the compartments 142 which they expect to use during a given shopping trip. In some cases, a user may even take a selection of identical interchangeable compartments 142 with them, shop at a first shop and fill a first set of compartments. The user may then return these to a car, switch the compartments 142 for empty compartments 142 (effectively emptying the device 100 in a convenient manner as the good remain ordered in the compartments 142), and embark on a trip to a second shop. This process can be repeated until there are no more compartments 142 or the shopping is complete. In order to unload the car, essentially the reverse process can be followed.

The device 100 is provided with notches 144 around the rim which defines the open top 108, in order that the compartments 142 can easily be lifted out of the cavity 104. The number and location of these notches 144 can vary with the number and type of insets 142 to be used with the device 100. As an alternative way of implementing this functionality, the legs 116, 122 may be detachable from the basket portion 102, for example if the basket portion 102 is selectively detachable from element 131, or if the legs 116, 122 are selectively detachable from element 131. In either case, straps, clips, clamps and so forth can be used to selectively couple and decouple the different parts of the device 100. Once detached, the basket portion 102 can be lifted onto a counter for paying for the items in the cavity 104, or into a car boot, for example, so that the legs can be collapsed without the complication of the weight of the basket portion 102 and any items retained in the cavity 104.

Although not shown in the Figures, the device 100 may include hooks, straps, pockets, pouches, etc. on an external surface, for example on the basket portion 102, for holding small items, bags, coats, etc. within easy reach of a user rather than, for example, these things becoming buried as items are added to the cavity 104.

As used herein, parts having an adjustable length may operate by any suitable means, for example telescoping. Adjustable lengths and/or angles may be provided in a way that allows any length or angle (as the case may be) between maximum and minimum values. In other examples, the possible lengths and angles may be constrained to certain preselected values, for example by the use of detents, ratchets, latches and the like.

The invention claimed is:

1. A device for transporting items, comprising:
    a generally cuboidal basket portion defining a cavity for receiving items, the basket portion having a base, an open top, two side walls spaced apart by a width of the basket portion and a front wall and a rear wall spaced apart from each other by a length of the basket portion;
    a front pair of legs pivotally attached to the basket portion at a first end of each front leg such that the front pair of legs is pivotable about a first axis, and wherein each of the front legs has a front leg length and wheel at a second end of each front leg, spaced from the first end by the front leg length;
    a rear pair of legs pivotally attached to the basket portion at a first end of each rear leg such that the rear pair of legs is pivotable about a second axis, and wherein each of the rear legs has a rear leg length and wheel at a second end of each rear leg, spaced from the first end by the rear leg length; and
    a handle pivotally attached to the basket portion such that the handle is pivotable around a third axis; wherein
    the device is configurable in a basket configuration and a trolley configuration; wherein in the basket configuration:
        the handle has a horizontal portion located across the width of the basket portion and above a central portion of the open top, the handle being configured for carrying the device; and
        the front and rear pairs of legs are collapsed so that the wheels of the front and rear pairs of legs are located adjacent to the base of the cuboidal portion; and wherein
    in the trolley configuration:
        the handle has a horizontal portion located rearward of the midpoint of the length of the basket portion, spanning the width of the basket portion, the handle being configured for pushing the device; and
        the front and rear pairs of legs are extended for supporting the basket portion and the wheels of the front and rear pairs of legs spaced away from the base of the cuboidal portion by the front and rear leg lengths respectively such that each of the four wheels lies in a single plane.
2. The device of claim 1, wherein an internal surface of the base of the basket portion is planar and wherein the plane of the internal surface of the base slopes relative to the plane in which the wheels lie when the device is in the trolley configuration.
3. The device of claim 2, wherein a distance between the front wheels and the internal planar base surface is shorter than a distance between the rear wheels and the sloping base when the device is in the trolley configuration.
4. The device of claim 1, wherein the front and rear pairs of legs are pivotable independently of one another.
5. The device of claim 1, wherein the transition from the trolley configuration to the basket configuration includes the front and/or rear wheels swinging rearward and towards the base.
6. The device of claim 1, wherein the base has at least one recess for receiving the front and/or rear wheels when the device is in the basket configuration, wherein the recess is located on an external surface of the base.
7. The device of claim 1, wherein an external region of the front edge of the base of the basket portion is adapted to engage with the lip of a car boot.
8. The device of claim 7, wherein the external region has a portion which slopes upward towards the front of the device, relative to the plane in which the wheels lie when the device is in the trolley configuration.
9. The device of claim 7, wherein the external region includes a padded portion for inhibiting damage to the car boot.
10. The device of claim 7, wherein the external region includes a textured portion for gripping the car boot.
11. The device of claim 1, wherein a portion of the front pair of legs is adapted to engage with the lip of a car boot.
12. The device of claim 1, wherein the third axis is the same as one of the first or second axes.
13. The device of claim 1, wherein the handle is attached adjacent to the base of the basket portion.
14. The device of claim 1, wherein the spacing between the pivotal attachment point of the handle and the horizontal portion of the handle is adjustable when the device is in the basket and/or the trolley configuration.
15. The device of claim 1, further comprising selective leg locking means for selectively locking the front and/or rear legs in their position for the basket configuration and/or the trolley configuration.
16. The device of claim 1, wherein at least one of:
    the front pair of legs;
    the rear pair of legs; and
    the handle is biased towards its location in the trolley configuration.
17. The device of claim 1, wherein at least one of the rear legs has a handle for pulling the leg towards its location in the basket configuration.
18. The device of claim 1, wherein the cavity is subdivided into compartments, optionally wherein the compartments are individually removeable and/or replaceable from the device, optionally wherein at least one compartment is provided with a lid and is lined with a thermally insulating material.
19. The device of claim 1, further comprising a pocket on the exterior of the basket.
20. The device of claim 1, wherein at least one of the legs has an adjustable length.

* * * * *